RADIO SYSTEM FOR MEASURING DISTANCE BY PHASE COMPARISON

Filed March 1, 1946 3 Sheets-Sheet 1

INVENTOR.
THEODORE M. MANLEY
BY Harry M. Saragovitz
Attorney

Nov. 14, 1950 T. M. MANLEY 2,529,510

RADIO SYSTEM FOR MEASURING DISTANCE BY PHASE COMPARISON

Filed March 1, 1946 3 Sheets-Sheet 2

INVENTOR.
THEODORE M. MANLEY
BY Harry M. Saragovitz
Attorney

INVENTOR
THEODORE M. MANLEY
By William D. Hall
ATTORNEY

Patented Nov. 14, 1950

2,529,510

UNITED STATES PATENT OFFICE 2,529,510

RADIO SYSTEM FOR MEASURING DISTANCE BY PHASE COMPARISON

Theodore M. Manley, Ann Arbor, Mich.

Application March 1, 1946, Serial No. 651,408

4 Claims. (Cl. 343—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a radio system and more particularly to a means and a method for providing a continuously reading presentation of distance between a plurality of locations by the transmission of radio energy.

One of the objects of the present invention is to provide a means for continuously informing an aeroplane pilot having a local station in his aeroplane of his varying proximity to a transceiver at a remote station located at a ground station, within another aeroplane, or elsewhere by the use of radio equipment and energy.

Another object of the invention is to provide radio means for warning an aeroplane pilot of his proximity to a dangerous object.

Another object is to provide a distance indicating radio system whereby a substantially continuous indication of distance can be obtained between a plurality of different local stations and a single remote station with a minimum of interference and interaction.

With the above and other objects in view that will be apparent to those who are informed in the field of radio transmission, illustrative embodiments of the present invention are shown in the accompanying drawings; wherein.

In the embodiment of the present invention that is presented herein, distance is measured by the time required to transmit a radio signal from a local station to a remote station and an answering signal to return. The time is indicated as the phase delay between a periodic modulation transmitted on a first carrier and the same modulation received back on a second carrier; the transfer of the modulation from the first carrier to the second carrier is made at the remote station effectively without loss of phase, since the delay introduced at the transfer is adjusted to be an integral multiple of a cycle. The phase delay is read directly upon an indicator calibrated in miles.

Figure 1:
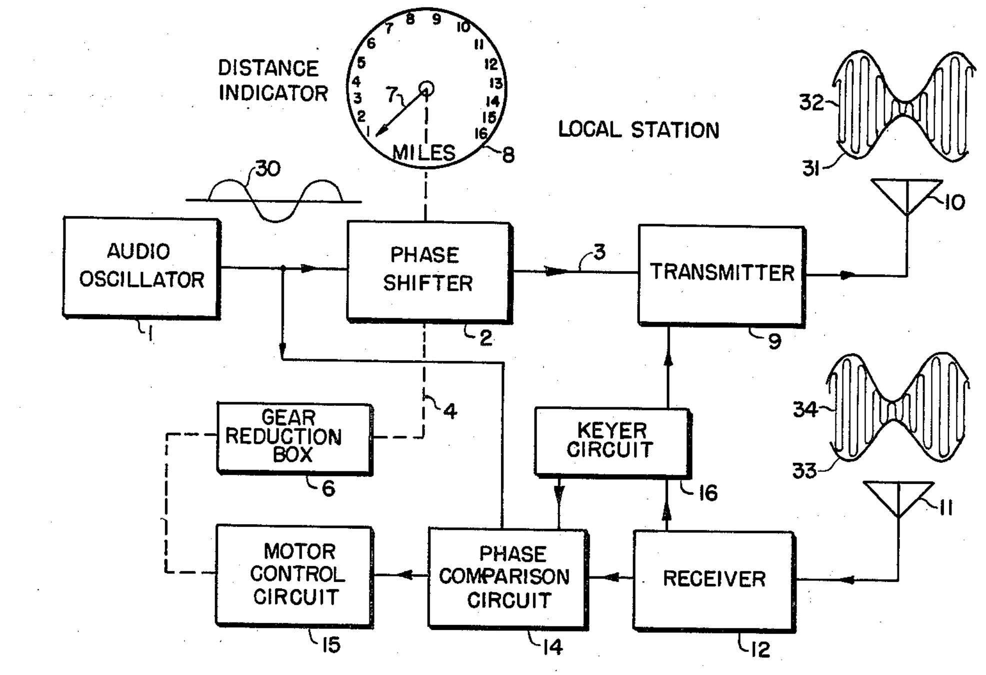
Fig. 1 is a block diagram of a radio circuit at a local station.
Figure 2:
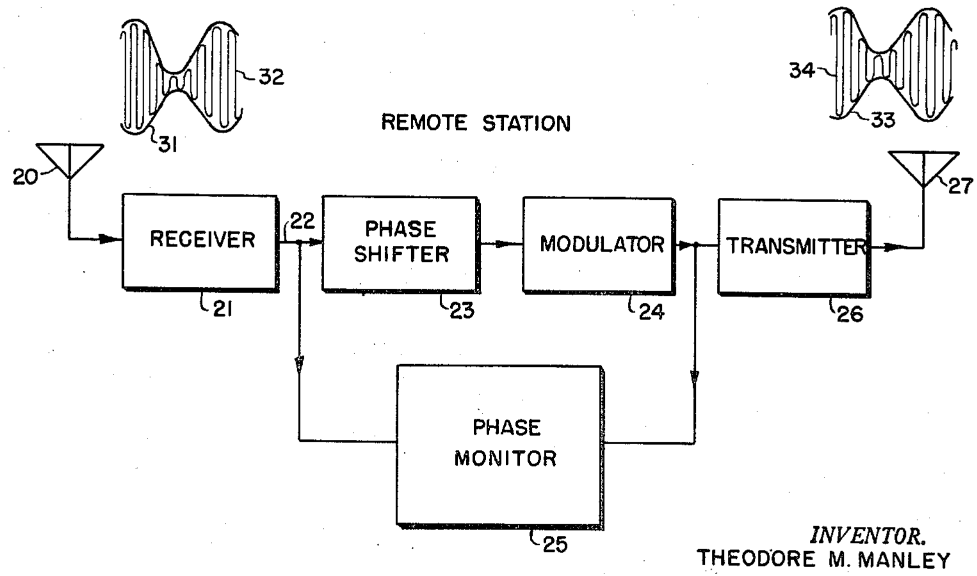
Fig. 2 is a block diagram of a radio circuit at a station that is remote from the local station.

In the present invention it is simpler to limit the extreme range over which distances are to be measured to ranges whose corresponding phase delays are not greater than 360 degress. Thus since the velocity of radio propagation is 186,000 miles per second, the time of travel of a radio signal over 200 miles is $\frac{1}{930}$ second, and since the present invention involves travel out and back, a range of 100 miles would correspond to 360 degrees phase delay in a 930 cycle audio signal. For shorter ranges a higher audio frequency would be used. The circuit that is shown in Fig. 1 is illustrative of a circuit at a local station which is provided with a distance indicating instrument. The circuit shown in Fig. 2 is illustrative of a circuit at a remote station to which distance from the local station shown in Fig. 1 is to be measured.

The radio circuit at the local station comprises a signal generating means, such as an oscillator 1 which generates an audio frequency sine wave voltage 30. Part of the output from the oscillator 1 is impressed upon a suitable phase shifter 2 and another part is impressed upon a phase comparison circuit 14 through a conductor 13. The output of the phase shifter 2 is shifted in phase from that of the oscillator 1 depending upon and proportional to the angular position of a shaft represented by a dash-line 4 in Fig. 1. This shaft is a part of a motor rotor 60 shown in Fig. 3. The shaft 4 mechanically couples the phase shifter 2 with a motor, part of a motor control circuit 15, through a gear reduction box 6. The shaft 4 is also coupled mechanically with an indicating arm 7 of continuously reading distance indicator 8 provided with a calibrated scale over which arm 7 passes in the usual manner. The phase shifter 2 may be of the Helmholtz type, or may be an equivalent circuit comprising variable capacitors and resistors, not shown, under the control and operation of the shaft 4.

The output voltage of the phase shifter 2 is applied to a transmitter 9 by a conductor 3 and serves to modulate, as indicated by the envelope 31, a first radio signal 32 that is generated in the transmitter 9 and radiated from an antenna 10.

The frequency of the first radio signal 32 from transmitter 9 may have any suitable value and preferably a value within the very high frequency range to minimize the effect of interference between stations and also of transients. The frequency of the first radio signal 32 from transmitter 9 may be either a single frequency or a desired number of different frequencies, and may be tuned by suitable means upon the operation of push buttons, switches, or the like, in a usual desired manner.

A receiving antenna 11 part of the local station, intercepts radio signals from a remote station shown in Fig. 2 and applies them to a receiver 12. These signals are illustrated by the wave 34. The received signals are demodulated in receiver 12 and the audio modulation output of the receiver 12 is applied in the phase comparison circuit 14. A keyer circuit 16, that preferably is an electronic switch to be described hereinafter, permits the energization of the circuit of the transmitter 9 and of the phase comparison circuit 14.

A part of the output from the oscillator 1 is applied to the phase comparison circuit 14, as stated previously. The phase comparison circuit 14 operates to compare the phase of the audio output of receiver 12 with that of the audio sine wave output 30 of oscillator 1. The phase comparison circuit 14 also controls the direction of rotation of the motor rotor 60 (Fig. 3) which is a part of the motor control circuit 15.

A block diagram of a preferred circuit at the remote station is shown in Fig. 2 of the accompanying drawings. In the circuit there shown a receiving antenna 20 intercepts signals 32 radiated from the sending antenna 10. These intercepted signals are applied to a receiver 21 where they are detected or demodulated and applied through a lead 22 to a phase shifter 23 and to a phase monitor 25. The phase shifter 23, that may be substantially a duplication of the phase shifter 2 in Fig. 1, applies its output to a modulator 24. The output from the modulator 24 is applied to a transmitter 26 and also to the phase monitor 25. The transmitter 26 generates a second radio signal, which is represented by modulated carrier 34. This second radio signal 34 is modulated by the audio signal from modulator 24 to provide the envelope 33 thereon. The second radio signal 34 is radiated or transmitted from an antenna 27 for interception by the receiving antenna 11 at the local station shown in Fig. 1.

Signal from the radiating antenna 27 may be of any desired frequency to which the receiver 12 can be tuned. The receiver 12 is tuned to the answering radio frequency signal radiated from the antenna 27.

In a similar manner the receiver 21 is tunable to any frequency from the transmitter 9 that can be radiated by the antenna 10. The carrier frequencies that are chosen for the first signal 32 that is radiated by the antenna 10 and the second signal 34 radiated by the antenna 27 should be such as to produce a minimum or negligible interaction, so that the receiver 12 does not pick up signal 32 from the antenna 10 and so that the receiver 21 does not pick up signal 34 radiated by the antenna 27. The selectivity of the receivers 12 and 21 also affect the choice of frequencies as outlined above. The transmitters 9 and 26 and the receivers 12 and 21 are usual forms of equipment.

Operatively, the audio oscillator 1 provides an audio frequency wave 30 that is advanced in phase as it passes through the phase shifter 2 and is then applied as modulation to the carrier that is provided by the transmitter 9. The resultant first modulated signal 32 is radiated by the antenna 10 and is intercepted at the remote station by the antenna 20. The receiver 21 demodulates this first signal wave 32 received from the antenna 20. The resulting audio signal is applied as modulation upon another radio frequency carrier provided by the transmitter 26. The modulated carrier supplies the second radio signal 34 which is radiated by the antenna 27.

At the local station this second radio signal is intercepted by the antenna 11 and passed to the receiver 12. In receiver 12 the signal is demodulated and this audio output is passed to phase comparison circuit 14. The phase comparison circuit 14 serves to compare the phase of the audio signal 30 that is generated by the oscillator 1, with the phase of the audio voltage which has passed through the cycle of transmission reception, retransmission and rereception. It is seen that the two audio signals compared are of the same frequency. The phase comparison circuit 14, as previously stated, operates to control the rotation of the motor rotor 60 in the motor control circuit 15. The motor rotor 60 rotates in one direction or in the opposite direction depending upon whether the phase of the output of receiver 12 leads or lags the phase of the reference signal 30 from the oscillator 1.

If the phase of the output of receiver 12 lags the phase of the reference audio sine wave voltage 30, the motor rotor 60 causes the phase shifter 2 to advance the phase of its output and so to decrease the amount of phase difference between the two signals in phase comparison circuit 14 to zero. If the phase of the output of receiver 12 leads the phase of the reference audio voltage 30, the motor rotor 60 is caused to rotate in the opposite direction until the phases in phase comparison circuit 14 are balanced. In either case the total amount of angular rotation measured from a fixed origin of the shaft 4 that is necessary to maintain a balance between the phases of the output of receiver 12 and the output of audio oscillator 1 is a measure of the phase shift that results from the transmission of the audio modulation to the remote station and return. (It is to be understood that transmitters 9 and 26 and receivers 12 and 21 introduce no phase shift of modulation.) The disposition of the arm 7 on the scale of the distance indicator 8 indicates directly and continuously the distance between the local station and the remote station. By operating the system in short pulsations of one-twentieth second or less every two seconds, the system is open for considerable time between successive pulsations for other desired communications.

During the brief interval of the time during which the signals are being transmitted and the two phases are being compared, impulses are supplied to the motor circuit 15 which in turn varies the phase shifter 2 through an appreciable portion of the 360° total available phase change. The transmissions are repeated at predetermined time intervals, as for example at two second intervals. The distance indicated by the arm 7 upon the scale of the indicator 8 is correlated with the phase delay introduced by phase shifter 2. The distance indicated will be caused to vary in small steps in accordance with the change in distance between the local station and the remote station during the time intervals.

The effect is to provide the local station with a substantially continuous indication of the distance between the local station and the remote station. The involved radio channels are in use for distance measurement but a small fraction of the time intervals. During the larger fraction of the interval between distance measurements the radio channels are open for other facilities, such as for another local station to measure the distance from it to the same remote station, for signal exchange, or the like. It will thus be seen that distance measurements made at approximately a predetermined rate and for predetermined time durations are provided for.

The keyer circuit 16 controls the operation of the system so that signals are sent and received during only a small fraction of a cycle of operation. The keyer circuit 16 supplies a blocking signal to transmitter 9 and to phase comparison circuit 14 during the greater portion of a cycle of two seconds. Once in the cycle, the blocking signal is removed for one-twentieth of a second and during that interval the equipment is functioning. This provision materially reduces the interference between this equipment and other transmissions, and in particular, interference between a multiplicity of these devices all on the same pair of frequencies. Further means, to be described later, are provided in the keyer circuit 16 to prevent operation of the device if a second device is in operation at the instant that the keyer circuit 16 would normally unblock the transmitter 9.

Figure 3:
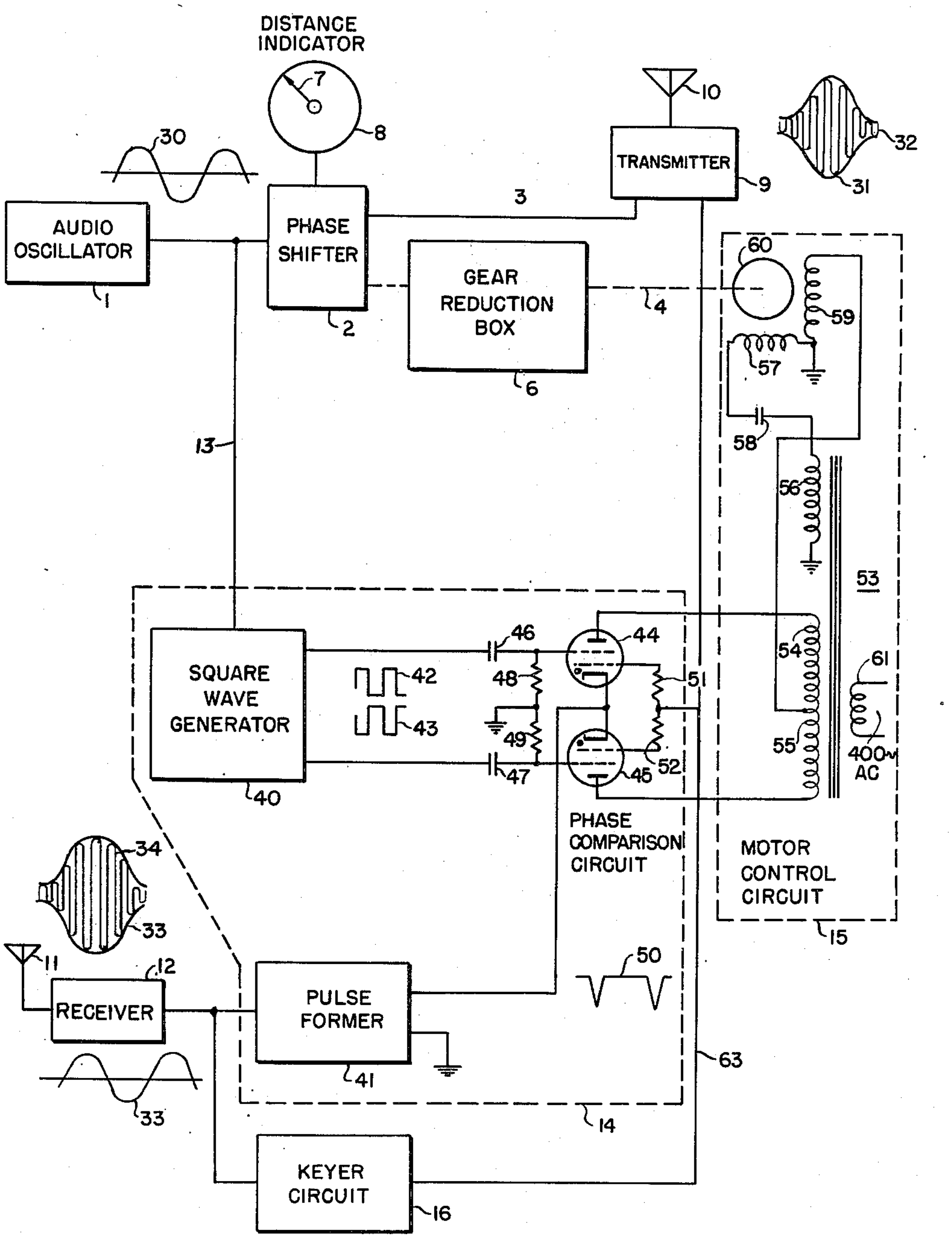
Fig. 3 is a block and schematic diagram of the circuit that is shown in Fig. 1, but in greater detail.

In Fig. 3, parts corresponding to those in Fig. 1 are identified by corresponding numerals. The phase comparison circuit 14 is shown as comprising a square wave generator 40 and a pulse former 41. The square wave generator 40 generates the square waves 42 and 43 from the sine wave voltage 30 received from audio oscillator 1. The square waves 42 and 43 are 180° out of phase with respect to each other and are applied simultaneously through coupling condensers 46 and 47 to screen grids of thyratron tubes 44 and 45 respectively. Direct current return path to ground for the screen grids of the tubes 44 and 45 is provided by resistors 48 and 49.

The pulse former 41 part of the phase comparison circuit 14 is used to form a train of pulses 50 of negative voltage from the sine wave which is the output of receiver 12. The train of pulses 50 has the same frequency as the sine wave from which it is formed and a constant phase relative thereto. The negative voltage pulses 50 are applied simultaneously to the cathodes of the thyratron tubes 44 and 45. A positive bias voltage from the keyer circuit 16 is applied intermittently to the control grids of the thyratron tubes 44 and 45 through the resistors 51 and 52, respectively, for the purpose of permitting the energization of the tubes 44 and 45 for a predetermined period of time as for one-twentieth second every two seconds. The plates of tubes 44 and 45 are connected push-pull to the divided secondary (comprising windings 54 and 55) of an alternating current transformer 53 to which 400 cycle alternating current is supplied through primary 61.

During the one-twentieth second during which the device is operating the control grids of tubes 44 and 45 are rendered sufficiently positive by voltage from keyer circuit 16 to permit the tubes 44 and 45 to function, other conditions being favorable. During the rest of a two second interval the voltage from keyer circuit 16 is so negative that the tubes 44 and 45 will not fire under any circumstances.

A negative pulse of train 50 is not of sufficient voltage to fire the thyratron tubes 44 and 45 of itself. However, in the presence of positive voltage on the plate from the alternating current supply and of positive voltage on the screen from square waves 42 or 43 either of thyratron tubes 44 or 45 will fire and continue to draw plate current until quenched by the alternating plate current swinging to the negative part of its cycle. It will be noted that since square waves 42 and 43 are of opposite phase both are not positive simultaneously. Therefore a negative voltage pulse of train 50 will fire at any one time only one of the tubes 44 and 45. Accordingly, as train 50 leads or lags the phase of the voltage 30 from audio oscillator 1 a negative voltage pulse of train 50 will fire one or the other of the tubes 44 and 45. In the circumstance that pulses of train 50 occur at the instant that both square waves 42 and 43 are changing from positive to negative and vice versa, neither of the tubes 44 or 45 will fire. This corresponds, as will appear, to phase shifter 2 being in precise adjustment for phase balance of transmitted and received signal and arm 7 on indicator 8 indicating precise range.

The plate circuits of tubes 44 and 45 are completed by connecting the junction of windings 54 and 55 with one field coil 59 of a two-phase induction motor having rotor 60 as shown in Fig. 3. The other field coil 57 receives its current from a secondary winding 56 of transformer 53. The current in coil 57 is shifted 90 degrees in phase to the current in coil 59 by the action of series capacitor 58. Current passes through coil 57 continuously but current passes through coil 59 only when tube 44 or tube 45 is fired. Accordingly, the motor turns only when tube 44 or tube 45 is fired, and the direction of rotation is one way or the opposite way according to which tube 44 or 45 is fired. If both tubes 44 and 45 were to fire simultaneously, no current would flow through the coil 59 and the motor rotor 60 would not turn. The resultant rotation of the motor rotor 60 turning the shaft 4 connected to the phase shifter 2 determines the disposition of the distance indicating needle 7 on the scale of the indicator 8, and thereby registers the distance between the local station and a remote station.

Figure 4:
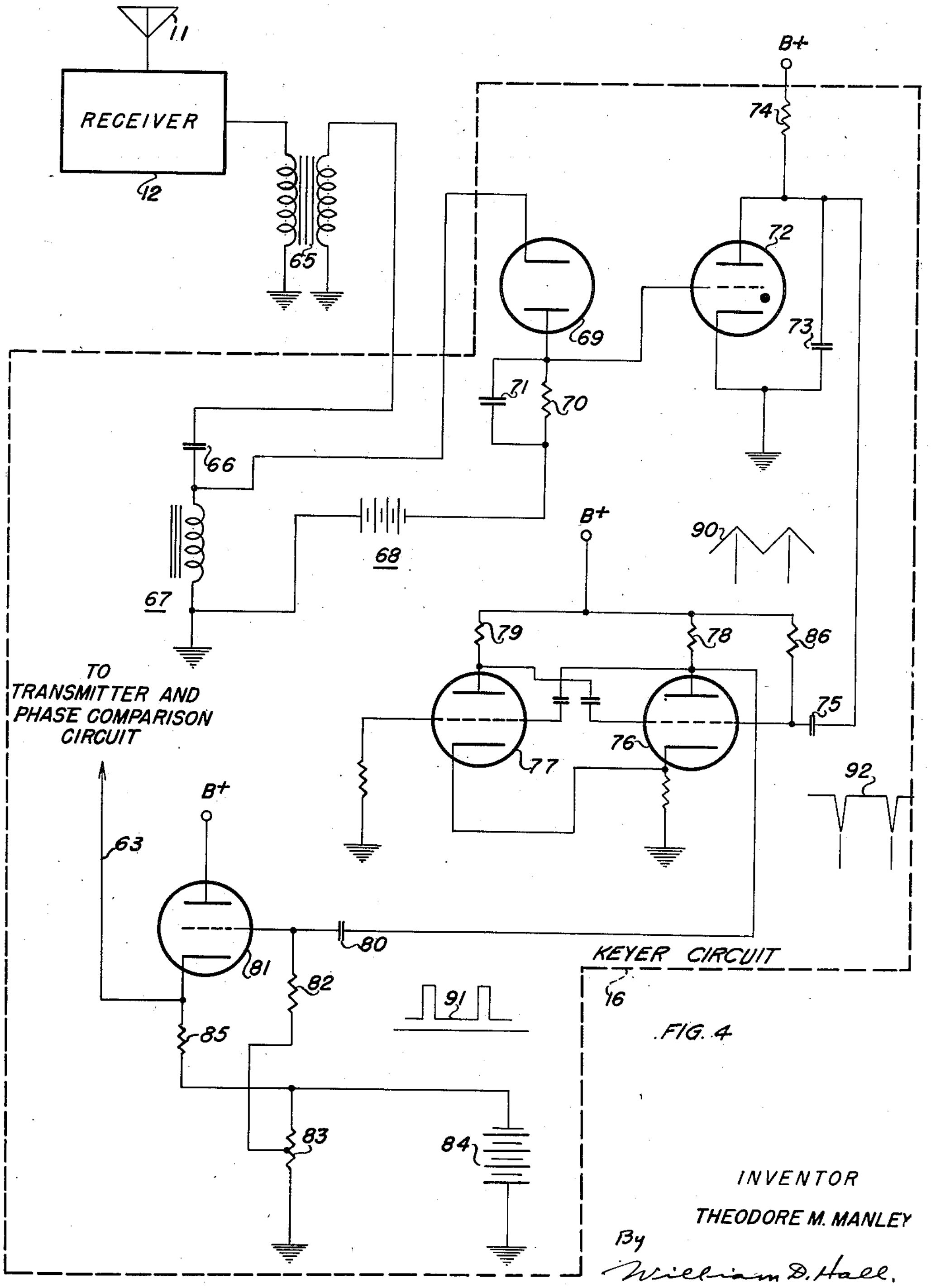
Fig. 4 is a schematic diagram of the keyer circuit part of the circuit that is shown in Fig. 1.

There is shown in Fig. 4 a detailed circuit for the keyer circuit 16. Gas tube 72 is shown connected as a conventional generator of sawtooth voltage 90 having a resistor 74 in the plate lead and a capacitor 73 between plate and cathode which determine a period of about two seconds. Grid bias is supplied by battery 68 in series with a load resistor 70.

The sawtooth voltage 90 is differentiated by a condenser 75 and a resistor 86 to provide a resultant pulse 92. The resultant pulse 92 is applied to the grid of an electronic tube 76 part of a usual type of "one-shot" multivibrator circuit. Plate current to the pair of multivibrator tubes 76 and 77 is supplied through resistors 78 and 79, respectively. The resistor 86 is interposed between the grid of tube 76 and the B+ power supply. Multivibrator output from the plate of the tube 76 is applied through a capacitor 80 to the grid of an electronic tube 81. The grid of the tube 81 is grounded through a resistor 82 and a tapped part of another resistor 83. The ungrounded end of the resistor 83 is connected to the negative terminal of a direct current power source 84 that has its positive terminal grounded and, through a resistor 85 to the cathode of the tube 81. The cathode of the tube 81 is also connected by lead 63 to the junction of the resistors 51 and 52 in the phase comparison circuit 14 and to the transmitter 9.

With the normal bias supplied to the grid of the tube 72 by battery 68, the capacitor 73 charges through the series resistor 74 at an exponential rate until the voltage across the thyratron tube 72 is sufficient to cause conduction. The conduction of the thyratron tube 72 discharges the capacitor 73 to a voltage below the ionization potential of the thyratron tube 72 and the discharge stops. Every two seconds this procedure is repeated.

The sawtooth output voltage 90 of tube 72 which is differentiated by the resistance-capacitance circuit 86, 75 is applied to the grid of the multivibrator tube 76 as previously described. The output of the "one-shot" multivibrator circuit is taken off the plate of the multivibrator tube 76 and is the square wave 91 of approximately one-twentieth second duration and occuring with each conduction of the thyratron tube 72.

These pulses of square wave voltage 91 are positive going pulses and are applied to the grid of the electronic tube 81. The tube 81 is normally non-conducting since its grid is returned to the contact on resistor 83 which is more negative than the cathode of the tube 81. The tube 81 is not conducting during the two second intervals between signals and hence the voltage at the cathode of the tube 81 is approximately the voltage across the resistor 83 or the voltage supplied by the cathode bias supplying battery 84.

The negative voltage supplied by the battery 84, when applied as bias to various circuits in the transmitter 9 and in the phase comparison circuit 14, render them inoperative. However, when the grid of the tube 81 is driven positive by the intercepted signal pulse, the tube 81 conducts and produces a voltage drop across the resistor 85 which reduces part of the voltage at the cathode of the tube 81. The circuit components are selected or adjusted so that the value to which the voltage rises is the normal operating bias of the circuits that are controlled and so that normal operation is achieved throughout the duration of the pulse.

Thus the keyer circuit 16 serves to energize the transmitter 9 and phase comparison circuit 14 for brief intervals at a periodic rate.

The circuit connected to diode rectifier tube 69 will now be described. The output transformer 65 of receiver 12 is shown connected across a series resonant circuit composed of capacitor 66 and inductance 67. This circuit is tuned to the audio frequency of oscillator 1 (which is the same for all sets using this system near a single remote station). Any audio signal of this frequency appearing in the output of receiver 12 puts a direct voltage across load resistor 70 and increases the negative bias on the grid of tube 72. By this means the requisite firing potential of the thyratron tube 72 is increased to a value that is greater than the plate supply voltage; the capacitor 73 will continue to charge and the conduction of discharge of the capacitor 73 will be delayed until the interfering signal disappears and tube bias is restored to normal, at which time the thyratron tube 72 will immediately fire. Thus the keyer circuit 16 will not operate to unblock transmitter 9, if there is already being received an interfering signal. It is to be noted that reception of an answering signal to a transmission from transmitter 9 will not block the transmitter because the answer always occurs just after thyratron 72 has already fired and the grid no longer controls.

It is within the purview of this invention to cover several different ranges by operating the audio oscillator at several different frequencies. The necessary changes in tuning are made in the audio circuits to accommodate the equipment to the various audio frequencies.

It is to be understood that other equivalent circuits and components may be substituted for the circuit associations and components that are shown herein within the concept of the present invention.

What I claim is:

1. A system for measuring distance between first and second points comprising, at said first point, means for generating a wave of fixed frequency and phase, a variable phase shifter coupled to said means, a radio transmitter modulated by the output of said phase shifter; means at said second point for receiving the signal from said transmitter and for retransmitting toward said first point a second signal modulated by the same wave as the received signal, a receiver at the first point for receiving said second signal and for deriving the modulation component thereof, phase comparing means for providing a voltage having a sign and value in accordance with the relative phase difference of said modulation component and said wave of fixed frequency and phase, a motor for operating said phase shifter in response to the voltage from said phase comparing means, said phase shifter being calibrated in terms of distance, electronic switch means for supplying blocking voltages for the control of the operation of said transmitter and said comparing means connected to be controlled from the receiver at said first point including means for controlling the operation of said switch means in response to the occurrence of signals in said receiver having the frequency of said fixed frequency wave.

2. In a system for measuring distance between first and second points, comprising means at said first point for generating a sine wave of fixed frequency and phase, a variable phase shifter coupled to said means for acting upon said first sine wave, and a radio transmitter modulated by the output of said phase shifter; means at said second point for receiving the signal from said transmitter and for retransmitting toward said first point a second signal modulated by the sine wave as the received signal, a receiver at the first point for receiving said second signal and for deriving the sine wave modulation component thereof, phase comparing means for detecting the relative phase difference of said modulation component and said sine wave, said phase comparing means including a square wave generator acting upon the first sine wave from said sine wave generating means to form a square wave having the same frequency as the first sine wave voltage and a fixed phase relative thereto, a pair of gaseous discharge tubes each having at least plate, grid and cathode and having their plate-cathode circuits energized in opposite polarity by a common alternating voltage, means applying the square wave across the grid-cathode circuit of one of said gaseous discharge tubes in one polarity and across the grid cathode circuit of the other tube in opposite polarity, a pulse former for acting upon a second sine wave voltage from said receiver at the first point of the same frequency as the first sine wave voltage to form a train of sharp pulses having a repetition rate equal to the frequency of the second sine wave voltage and a fixed phase relative thereto, means for applying said second sine wave to said pulse former, means for applying the train of pulses in common to the grid-cathode circuits of said gaseous discharge tubes to drive the grids of said tubes positive with respect to the cathodes, means for deriving from the plate-cathode circuits of said gaseous discharge tubes a signal indicative of that half cycle of the first sine wave voltage in which the pulses of the pulse train fall, and means responsive to the indicative signal and having means associated therewith for acting upon said phase shifter to adjust the first sine wave voltage until the phase difference is zero, said phase shifter being calibrated in terms of distance.

3. In a system for measuring distance between first and second points, comprising at said first point, means for generating a sine wave of fixed frequency and phase, a variable phase shifter coupled to said means, and a radio transmitter modulated by the output of said phase shifter; means, at said second point, for receiving the signal from said transmitter and for retransmitting toward said first point a second signal modulated by the same wave as the received signal, a receiver at the first point for receiving said second signal and for deriving the modulation component thereof; phase comparing means for detecting the relative phase difference of said modulation component and said sine wave, means controlled by said phase comparing means for varying said phase shifter until said phase difference is zero, said phase shifter being calibrated in terms of distance; keying means for radio transmitter and said phase comparing means, and means for connecting said keying means with said receiver at the first point, said keying means including a source for normally supplying a blocking voltage to said transmitter and to said phase comparing means, means for generating unblocking pulses for rendering ineffective said blocking voltage, said unblocking pulses having a duration as to permit at said point the transmission and reception of the transmitted signal during the occurrence of said pulses, and means for delaying the formation of said unblocking pulses in response to any signal in said receiver at the first point having the frequency of said first named sine wave, except such signals which occur during the period of an unblocking pulse.

4. The system, according to claim 3, wherein said means for generating unblocking pulses comprises a sawtooth voltage generator, a differentiator and multi-vibrator circuit, and said delaying means includes means for filtering from the output of said receiver any signal received having the frequency of said first named sine wave, means to rectify said filtered output, and means for applying said rectified and filtered output as additional bias to said sawtooth voltage generator.

THEODORE M. MANLEY.

REFERENCES CITED

The following references are of record in the file of this patent:

UNITED STATES PATENTS

| Number | Name | Date |
|---|---|---|
| 717,767 | Shoemaker | Jan. 6, 1903 |
| 1,756,462 | Jenkins | Apr. 29, 1930 |
| 1,945,952 | Nicholson | Feb. 6, 1934 |
| 2,134,716 | Gunn | Nov. 1, 1938 |
| 2,183,725 | Seeley | Dec. 19, 1939 |
| 2,198,113 | Holmes | Apr. 23, 1940 |
| 2,248,727 | Strobel | July 8, 1941 |
| 2,253,975 | Guanella | Aug. 26, 1941 |
| 2,287,174 | Heising | June 23, 1942 |
| 2,428,966 | Gage | Oct. 14, 1947 |
| 2,437,027 | Homrighous | Mar. 2, 1948 |

FOREIGN PATENTS

| Number | Country | Date |
|---|---|---|
| 784,425 | France | July 22, 1935 |

Certificate of Correction

Patent No. 2,529,510 November 14, 1950

THEODORE M. MANLEY

It is hereby certified that error appears in the printed specification of the above numbered patent requiring correction as follows:

Column 9, line 27, after the word "for" insert *said*;

and that the said Letters Patent should be read as corrected above, so that the same may conform to the record of the case in the Patent Office.

Signed and sealed this 9th day of January, A. D. 1951.

[SEAL]

THOMAS F. MURPHY,

*Assistant Commissioner of Patents.*